United States Patent [19]

Reimert

[11] 4,429,904
[45] Feb. 7, 1984

[54] SELF-ALIGNING CONNECTOR

[75] Inventor: Larry E. Reimert, Houston, Tex.

[73] Assignee: Dril-Quip, Inc., Houston, Tex.

[21] Appl. No.: 373,114

[22] Filed: Apr. 29, 1982

Related U.S. Application Data

[63] Continuation-in-part of Ser. No. 280,302, Jul. 6, 1981.

[51] Int. Cl.³ .................. F16L 55/00; F16L 25/00
[52] U.S. Cl. .................................. 285/24; 285/27;
285/334
[58] Field of Search ............... 285/333, 334, 24, 27,
285/391

[56] References Cited

U.S. PATENT DOCUMENTS

| | | |
|---|---|---|
| 1,372,238 | 3/1921 | Kreiter . |
| 1,629,058 | 5/1927 | Wilson .................. 285/391 X |
| 1,637,628 | 8/1927 | Weisgerber .............. 285/334 X |
| 1,927,656 | 9/1933 | Eaton et al. ............. 285/334 X |
| 2,062,407 | 12/1936 | Eaton .......................... 285/334 |
| 2,196,966 | 4/1940 | Hammer ...................... 285/333 |
| 2,450,453 | 10/1948 | Boehm ...................... 285/334 X |
| 3,224,799 | 12/1965 | Blose et al. ................. 285/334 |
| 3,345,084 | 10/1967 | Hanes et al. . |
| 3,345,085 | 10/1967 | Hanes . |
| 3,381,983 | 5/1968 | Hanes . |
| 3,388,752 | 6/1968 | Hanes et al. .............. 285/334 X |
| 3,455,578 | 7/1969 | Hanes . |
| 3,468,563 | 9/1969 | Duret ....................... 285/334 X |
| 3,521,911 | 7/1970 | Hanes et al. . |
| 3,540,760 | 11/1970 | Miller et al. . |
| 3,854,760 | 12/1974 | Duret ......................... 285/334 |
| 3,989,284 | 11/1976 | Blose ....................... 285/334 X |
| 4,009,893 | 3/1977 | Schafton et al. ........... 285/334 X |
| 4,026,583 | 5/1977 | Gottlieb .................... 285/334 X |
| 4,113,290 | 9/1978 | Miida ......................... 285/334 |
| 4,120,520 | 10/1978 | Ahlstone . |
| 4,124,229 | 11/1978 | Ahlstone .................... 285/18 |
| 4,124,232 | 11/1978 | Ahlstone .................... 285/18 |
| 4,161,332 | 7/1979 | Blose ......................... 285/334 |
| 4,192,533 | 3/1980 | Blose ......................... 285/334 |
| 4,209,193 | 6/1980 | Ahlstone . |
| 4,244,607 | 1/1981 | Blose ....................... 285/334 X |

FOREIGN PATENT DOCUMENTS

| | | |
|---|---|---|
| 1466746 | 12/1966 | France . |
| 2475618 | 8/1981 | France . |
| 2064041 | 6/1981 | United Kingdom ........ 285/334 |

Primary Examiner—Richard J. Scanlan, Jr.
Attorney, Agent, or Firm—Browning, Bushman, Zamecki & Anderson

[57] ABSTRACT

Proper alignment of threads when joints of casing are made up in hostile environments, such as on off-shore floating platforms subject to being buffeted by wave action, is provided by means of an improved box and pin connector. The pin has a substantially tapered threaded section whose small diameter end terminates in a lower guide section and whose large diameter is adjacent a larger diameter upper guide section. The box has a complementary section of internal oppositely tapered threads to mate with those on the pin as well as a smaller lower receptacle to receive the lower guide section on the pin and a larger receptacle to receive the upper guide section on the pin. The upper and lower guide sections on the pin and complementary receptacles in the box guide the threads into proper alignment. The threads are sufficiently tapered so that the guide sections and complementary receptacles are mutually, partially engaged prior to engagement of the threads. The threads have a back slant that prevents expansion of the box.

30 Claims, 9 Drawing Figures

SELF-ALIGNING CONNECTOR

This is a continuation-in-part of copending U.S. application Ser. No. 280,302, filed July 6, 1981.

BACKGROUND OF THE INVENTION

1. Field of the Invention

The invention relates to connectors for cylindrical or tubular members, and more particularly to connectors for use on pipe and casing used in oil well drilling, or the like.

2. Description of the Prior Art

When a hole is bored into the earth, as for the production of oil and gas, a large diameter pipe known as surface casing is usually installed into the upper section of the borehole. Surface casing stabilizes the walls of the borehole near the surface where they are more apt to cave in. On holes drilled in offshore waters from platforms, or jack-ups, the pipe is extended from the ocean floor to the deck of the drilling structure and is known as a marine riser. In such case, the riser is an extension of the surface casing and serves to prevent entry of sea water into the borehole.

Make up and installation of pipe such as surface casing from floating offshore drilling structures or vessels is complicated by the actions of waves on the vessel. Various motions of the vessel, of which the most critical are roll and pitch, render the make up of screw-type connections very difficult. Not only is it difficult to stab one casing section into another, but it is also difficult to attain proper alignment during make up, which can result in destructive cross-threading. While running casing of any kind is difficult in such hostile environments, it is particularly difficult for larger casing strings, such as twenty inches or larger. This is due not only to the greater mass of such larger casing but also to the decrease in allowable make-up angle for a given pitch thread as the pipe diameter increases.

To overcome these problems, the industry has resorted to use of large pitch (two or three threads per inch), tapered threads to assist in fast make-up in hostile environments without cross threading. Unfortunately, such coarse threads concentrate stresses due to the depth of the threads in relation to the load carrying cross-sectional thickness of the connector. This greatly increases the likelihood of connector failure. Currently used connectors are also subject to failure if the box joint expands, or "bells out," when the joint is under excessive tension and/or bending type loads.

Accordingly, it is an object of the present invention to provide a technique for connecting pipe such as casing, or the like, that is easier to make up under hostile conditions such as those encountered on floating drilling structures.

It is another object of the invention to provide a pipe connector that is less susceptible to stress failure.

It is a further object of the invention to provide a connector that is less likely to "bell out" and thereby cause a connection failure.

It is a further object of the invention to provide threads which facilitate make up which do not disengage due to expansion of the joint.

Other objects and advantages of the invention will become apparent from a reading of the attached claims and description of the preferred embodiments.

SUMMARY OF THE INVENTION

These and other objects of the invention are attained by providing one longitudinal member with an externally threaded end section and a second longitudinal member with an internally threaded tubular end section adapted to mate with the externally threaded section. The externally threaded section is provided with a guide section adjacent to threads at one end thereof and a smaller guide section at the other end. The internally threaded member is provided with a receptacle adjacent the threads at one end thereof and sized to receive the smaller guide section, and another receptacle adjacent the threads at the other end thereof and sized to receive the larger guide section. The guide sections, the corresponding receptacles, and the taper of the threads are adapted to permit engagement of the guide sections in the corresponding receptacles prior to engagement of the threads. This enables proper alignment of the threads before they are engaged and screwed together. In another aspect of the invention, the threads on both the externally threaded section and the internally threaded section are back tapered to provide slanted mating loading surfaces of the meshed teeth for lateral support to prevent thread disengagement due to expansion of the internally threaded section.

BRIEF DESCRIPTION OF THE DRAWINGS

The invention may be better understood by reading the attached description of preferred embodiments thereof in conjunction with the attached drawings wherein.

DESCRIPTION OF PREFERRED EMBODIMENTS

Figure 1:
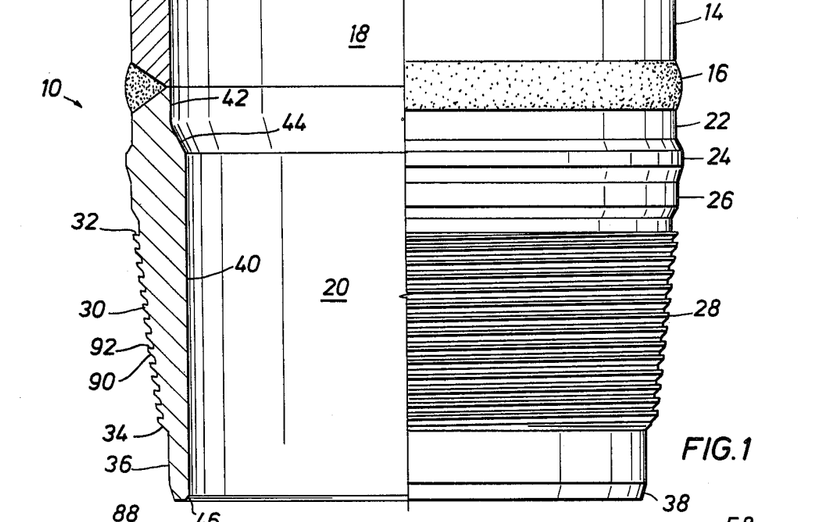
FIG. 1 is a longitudinal quater section of a pin connector in accordance with the present invention.
Figure 2:
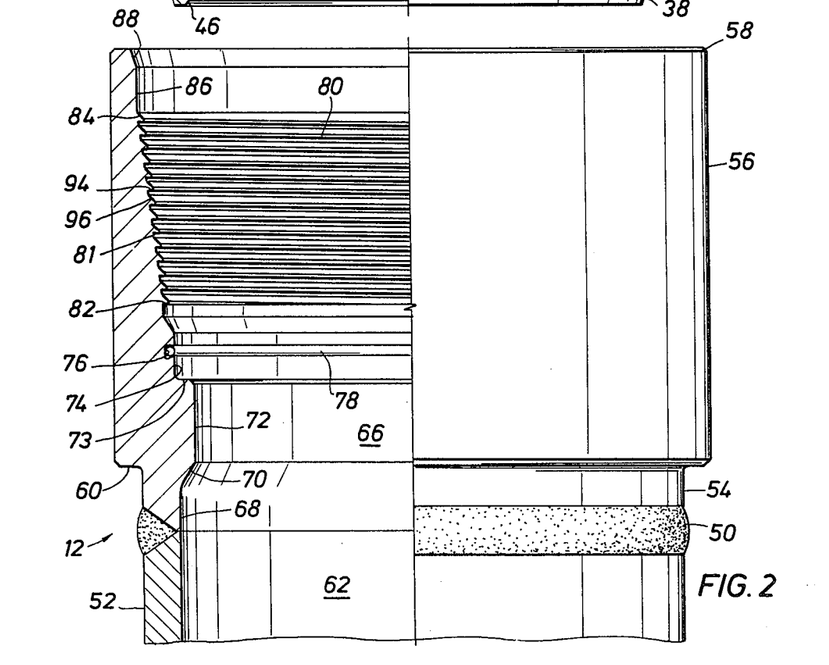
FIG. 2 is a longitudinal quarter section of a box connector suitable for reception of the pin connector of FIG. 1.

Referring to FIGS. 1 and 2, a pin joint is shown generally at 10 in FIG. 1 in alignment with and ready for insertion into a box joint shown generally at 12 in FIG. 2. Pin 10 is shown above box 12, which is the preferable arrangement for reasons to be outlined below.

Referring particularly to FIG. 1, pin 10 is attached to a cylindrical member 14 by means of weld metal 16. Cylindrical member 14 may be tubular in shape and have a bore 18. Pin 10 may also be tubular and have a bore 20 which may be an extension of bore 18 of longitudinal member 14, which is cylindrical for casing applications.

Now describing the exterior of pin 10 in detail, generally from the top to the bottom on the drawing, pin 10 has a weld section 22 which is generally the same diameter as longitudinal member 14. Weld section 22 provides an area for securing pin 10 to longitudinal member 14 with weld metal 16. Next is an upset section 24 having a larger diameter than weld section 22 and a tapered lower surface. Following upset section 24 is a cylindrical upper guide section 26. Guide section 26 provides a flat (when viewed in longitudinal cross section) and serves to guide pin 10 into box 12 in a manner hereinafter described. Next near the bottom of pin 10 is a frustoconical section 28 having a multiplicity of threads 30 cut thereon. Typically, the taper of the frustoconical threaded surface is about three inches per foot. At the upper base 32 of frustoconical section 28, threads 30 are essentially the same diameter, or slightly smaller, than that of upper guide section 26. Threads 30 taper down toward lower base 34. The taper of frustoconical thread section 28 is substantial and is chosen to permit threaded section 28 to travel substantially into the mating threaded section in box 12 (described hereinbelow) before thread engagement begins. Nearest the lower end of pin 10 is a lower guide section 36, having a bevelled lower edge 38. Guide section 36 is generally cylindrical in shape and, like upper guide section 22, provides a flat to insure thread alignment in a manner hereinafter described. The bore 20 of pin 10 comprises two cylindrical voids defined by walls 40 and 42 connected by a frustoconical void defined by wall 44 as shown. Void 42 is essentially the same diameter as bore 18 and is larger than void 40. Void 40 is bevelled at its lower end 46.

Referring now to FIG. 2, a box joint 12 for threaded mating with pin 10 of FIG. 1 is shown. Box 12 is connected by means of weld metal 50 to a longitudinal member 52, which is tubular for casing applications. On its exterior, box 12 comprises a cylindrical weld section 54 which is essentially the same diameter as longitudinal member 52 and provides an area for welding to member 52 with weld metal 50. Adjacent to weld section 54 and extending to the upper end of box 12 is a tubular end section 56 which is larger in diameter than section 54 and has a bevelled end 58. Section 56 has, in its interior, threads for mating with threads 30 of pin 10, to be described hereinafter. The transition from weld section 54 to end section 56 defines an annular shoulder 60, which is useful in supporting the member 52, and other like members connected thereto, when a tubular string is being made up, for example. For this reason, it is preferable that the box be oriented below the pin, since it is difficult or at least inconvenient to provide a shoulder on a pin such as 10.

Now describing the interior of box 12, longitudinal member 52 has a cylindrical bore 62. Cylindrical bore 62 is in communication with a generally cylindrical bore 66 in box 12. Nearest longitudinal member 52, bore 66 has a wall 68 defining a cylindrical void at weld section 54. Cylindrical section 68 is connected to a wall 72, defining a smaller diameter cylindrical neck void of the bore 66, by means of a frustoconical void defined by wall 70. Next toward the top end of box 12 is a cylindrical void defined by wall 74 and having a diameter larger than void 72. A shoulder 73 connects the void 72 with the wall 74. Wall 74 provides a flat for receiving lower guide portion 36 on pin 10 and is broken by an annular groove 76 for receiving therein an O-ring sealing member 78 sized to fit therein. Groove 76 is dove-tailed to hold the O-ring in place. The depth of annular groove 76 is slightly less than the diameter of the O-ring cross section so that the O-ring will provide a pressure seal against guide section 36 of pin 10.

Next to inner guide wall 74 and toward the upper end of box 12 is a frustoconical void 80 having a multiplicity of threads 81 of the same pitch as the threads 30 on threaded portion 28 on pin 10. Threaded void 80 is also sloped to matingly receive threaded portion 28 of pin 10, having its smaller diameter lower base 82 adjacent to inner guide wall 74, and its larger upper base 84 toward the top end of box 12. Nearest the top end of box 12 is an internal cylindrical void defined by wall 86 and having a bevelled lip 88 and sized to receive upper guide portion 26 of pin 10. The combination of guide portion 26 and void 86 acts to guide the threaded portion 28 on pin 10 and threaded portion 80 on box 12 together without cross-threading. Similar guidance on the opposite end of threaded portions 28 and 80 is provided by the combination of lower guide portion 36 and void 74.

Figure 9:
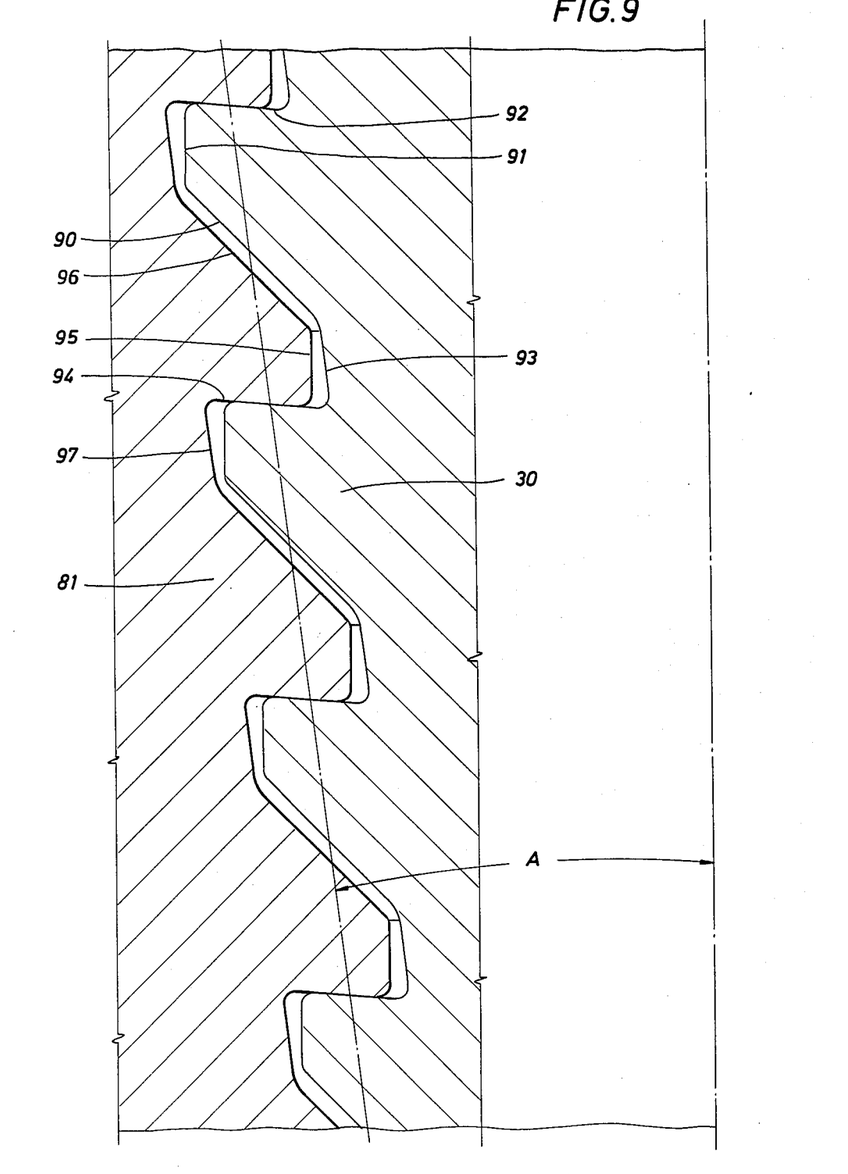
FIG. 9 is a fragment of a longitudinal section of pin and box connectors illustrating features of the internal and external threads.

Details of the connector threads may be appreciated by reference to FIG. 9 wherein the threads 30 and 81 are meshed. The threads 30 and 81 on both threaded portions 28 of pin 10 and 80 in box 12 typically have a pitch of about four threads per inch, and a cone taper of three inches per foot, with a half central angle A of approximately seven degrees, seven and one-half minutes relative to the respective pin and box longitudinal axes, which are common with the threads mated. The lower side 90 of each thread 30 is bevelled downwardly typically at an angle of up to about forty-five degrees relative to the axis of the pin 10. The thread crest 91 is parallel to the longitudinal axis of the pin 10. The upper thread side 92 is bevelled downwardly and inwardly typically forming an acute angle of up to about eighty-five degrees relative to the pin axis so that the thread surfaces 90 and 92 cooperate to form essentially a wedge shape. The thread roots 93 exhibit the three-inch-per-foot taper of the thread cone 28 (FIG. 1). The box threads 81 are generally complementary to the pin threads 30. The lower side 94 of each thread 81 is bevelled downwardly typically at an angle of up to about eighty-five degrees relative to the longitudinal axis of the box 12. The thread crest 95 is parallel to the box longitudinal axis. The upper thread side 96 is bevelled downwardly typically at an angle of about forty-five degrees relative to the box axis so that the thread surfaces 94 and 96 cooperate to form essentially a wedge shape. The thread roots 97 exhibit the three-inch-per-foot taper of the thread cone 80 (FIG. 2). The two sets of threads 30 and 81 mesh with back-slanted mating surfaces 92 on the pin threads and 94 on the box threads. When such threads are fully engaged, the wedge shapes, and particularly the wedging of the back-slanted mating surfaces 92 and 94, provide thread security not only down the length of the joint but also across the width of the joint. This prevents the joint from failing due to expansion of the box diameter during stress, a condition known as "belling."

Figure 3:
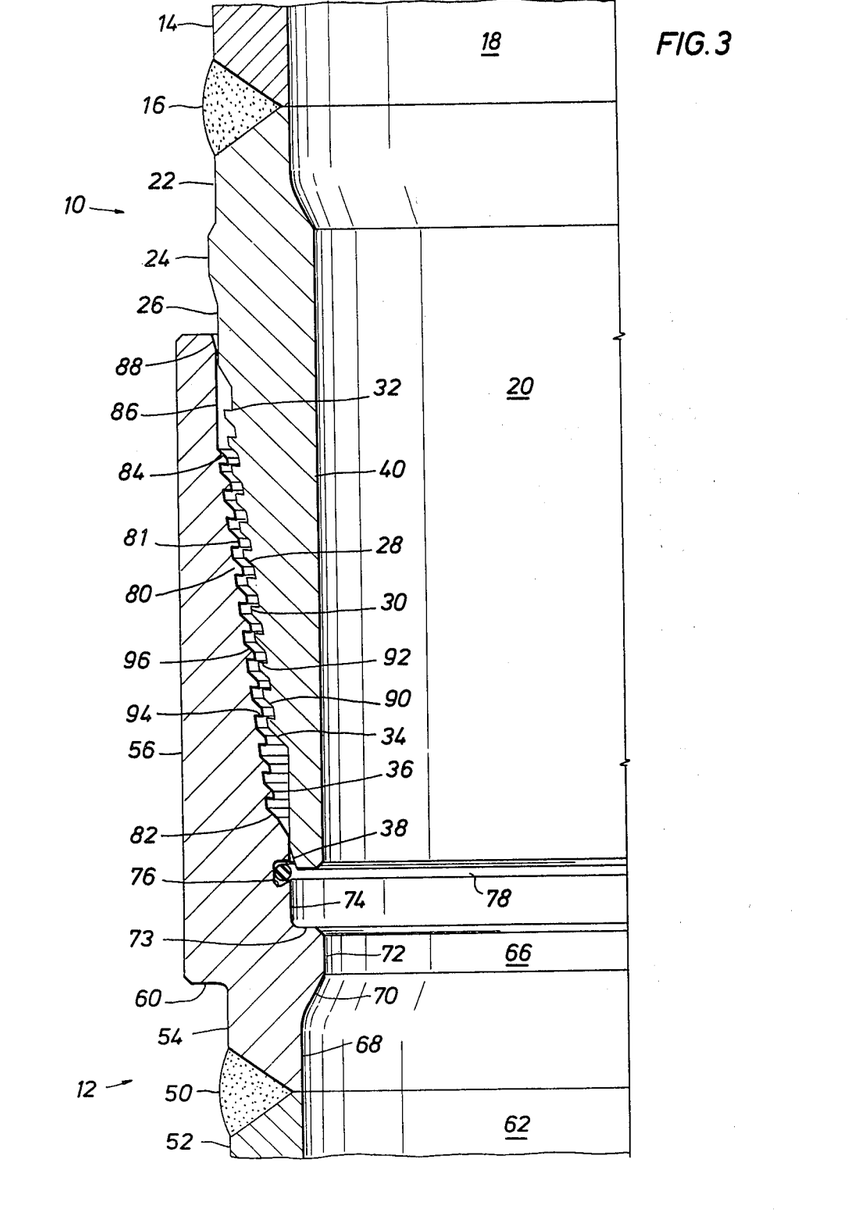
FIG. 3 is a fragment of a longitudinal cross section of the box and pin of FIGS. 1 and 2 in partial connection.

Referring to FIG. 3 the manner of operation of the invention is illustrated by showing pin 10 and box 12 in partial engagement. To make up the joint, a section of tubing with its pin joint 10 in the down position is brought over another section of tubing with its box joint 12 facing upwardly and longitudinally in line therewith. Box 12 may be supported by an elevator or other means engaging support shoulder 60. Thus it is preferred that the tubing string be made up with box joints 12 facing upwardly and pin joints 10 facing downwardly to provide shoulders 60 for support.

When the smaller and lower end of pin 10 is sufficiently aligned with the relatively larger upper end of box 12, pin 10 is lowered into box 12. As pin 10 enters box 12, the downwardly bevelled lower side 90 of threads 30 on pin 10 may contact the bevelled lip 88 at the box wall 86 and/or the upwardly bevelled upper sides 96 of threads 81 in box 12. Due to the slant of the thread surface 90 and to the complementarily bevelled faces of threads 30 and 81, pin 10 continues to slide downwardly into box 12, pin 10 being self-centering as it enters box 12. Similar sliding contact may also be made between the bevelled upper edges 96 of threads 81 and bevelled end 38 at lower guide portion 36. Further, the thread crests 91 and 95 of the pin 10 and box 12, respectively, are complementary, being parallel to the pin and box longitudinal axes. Consequently, any crest-to-crest contact between the threads 30 and 81 during make up of the joint does not impede longitudinal movement between the pin and box.

When pin 10 is centered in box 12, lower guide portion 36 enters guide void 74 and upper guide portion 26 enters guide void 86. The engagement of the flats (as viewed in cross section) provided by the walls of voids 86 and 74 and the upper and lower guide portions 26 and 36, respectively, force vertical alignment of pin 10 with box 12. With the pin 10 and box 12 thus aligned, the lower guide section 36 may be received in the lower guide void 74, and the upper guide section 26 may be received in the upper guide void 86, with no contact between the two sets of threads 30 and 81 as shown in FIG. 3. Thus, the two connectors 10 and 12, and the tubular members 14 and 52, respectively, joined thereto, are forced into alignment by the cooperation of the upper and lower guide-section-and-void combinations before the two sets of threads 30 and 81 begin to mesh. Consequently, threads 30 on pin 10 and threads 81 in box 12 are forced into alignment for proper thread engagement and held that way before such engagement begins. Cross threading is thereby prevented.

At this point, pin 10 is further advanced into box 12 and rotated in the proper direction relative to box 12 to engage threads 30 and 81 and pull pin 10 downwardly into box 12 until the joint is tight. Typically, about two turns would be required to tighten the joint once the threads were initially meshed. As lower guide portion 36 enters inner guide void 74, the lower guide portion 36 contacts the inside of O-ring 78, thereby providing a seal between the interior and the exterior of the pipe string.

Figure 4:
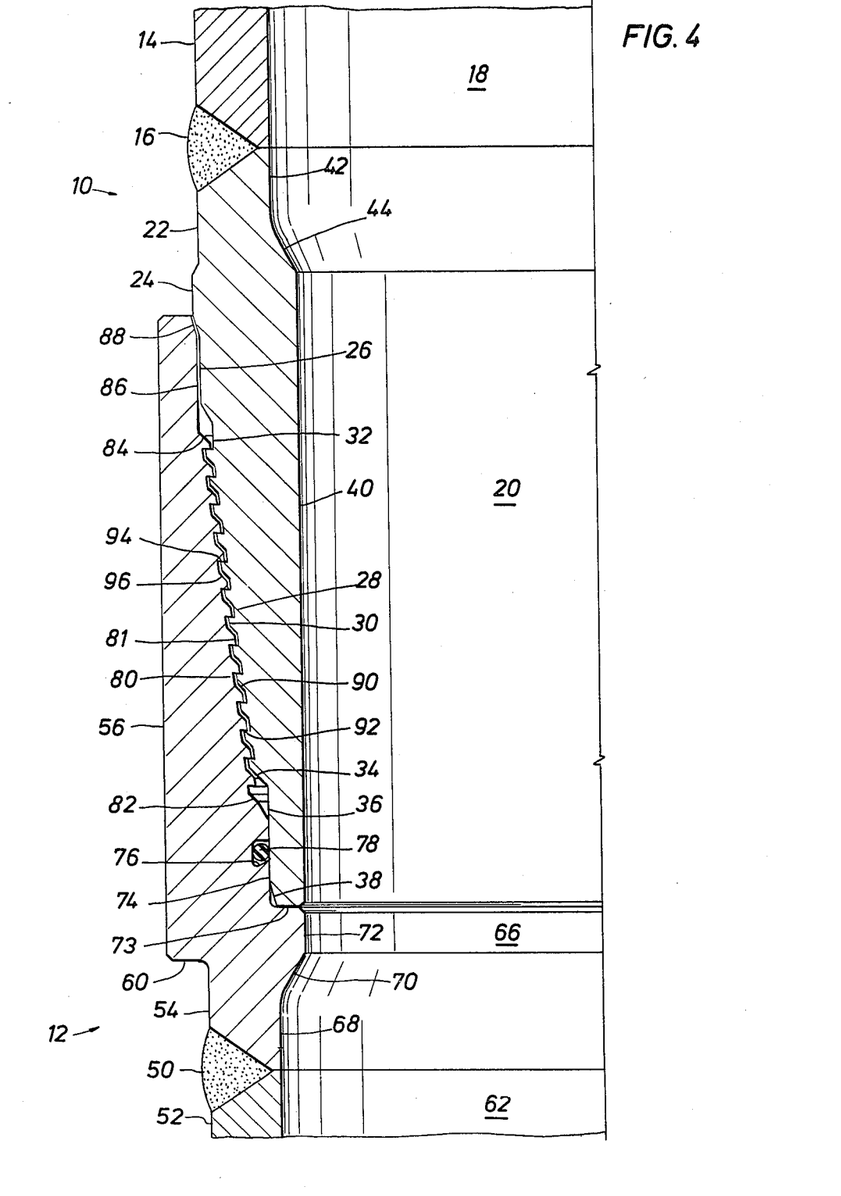
FIG. 4 is a view similar to FIG. 3 but with the box and pin connectors of FIGS. 1 and 2 in full connection.

Referring to FIG. 4, pin 10 and box 12 are shown in a fully engaged position. Travel of pin 10 into box 12 is limited by the seating of the pin end against the box internal shoulder 73. On the lower end of pin 10, lower guide portion 36 is received within wall 74 defining the lower guide void in box 12. A seal to prevent the movement of fluids between the interior and exterior of the pipe string is provided by O-ring 78 which is positioned in an annular groove 76 and engaged with the guide surface 36 acting as an annular seating surface. Locking engagement of threads 30 on pin 10 with threads 81 on box 12 is provided by the wedging of the upper faces 92 of threads 30 with the lower faces 94 of threads 81 (FIG. 9). The thread surfaces 92 and 94 are thus mutually wedged with no contact between the pin thread crests 91 and the box thread roots 97, no contact between the pin roots 93 and the box crests 95, and no contact between the lower pin thread surface 90 and the upper box thread surface 96. These surfaces do not contact with the threads 30 and 81 fully wedged because the bottom of the pin 10 abuts the box shoulder 73 before such contact can be effected. Thus, the back-slanted, wedging surfaces 92 and 94 are fully loaded with the forces locking the pin 10 and box 12 together. Further, the mutual wedging engagement of the back slanted threads prevents box 12 from expanding and thereby prevents thread disengagement due to belling out of the box since any tendency of the box to expand results in the pin threads pulling radially inwardly on the box threads.

As a pin connector is stabbed into a box connector, as shown in FIG. 3 for example, the combination of the upper guide section 26 and the upper receptacle surface 86 and the combination of the lower guide surface 36 with the lower receptacle surface 74 operates to align the pin with respect to the box such that the maximum angular misalignment possible is less than would allow the pin and box threads to cross thread. Thus, the combined clearance between the combination of the upper surfaces 26 and 86 and between the lower surfaces 36 and 74 cannot exceed a value determined by the diameter of the threads, the number of threads per inch and the vertical distance between the two sets of surfaces 26; 86 and 36; 74. However, for ease of stabbing and reliability in field use, it is desirable to have clearances between the surfaces 26 and 86 and between the surfaces 36 and 74 that are as large as possible and which still prevent cross threading. But when the pin 10 is fully mated with the box 12 as shown in FIG. 4, the clearance between the lower guide surface 36 and the corresponding receptacle surface 74 must be sufficiently small to achieve a reliable seal therebetween by means of the O-ring seal member 78. Since there is no seal requirement between the upper guide surface 26 and the corresponding receptacle wall 86, an especially small clearance between these surfaces in the made up configuration of FIG. 4 is not required.

Figure 5:
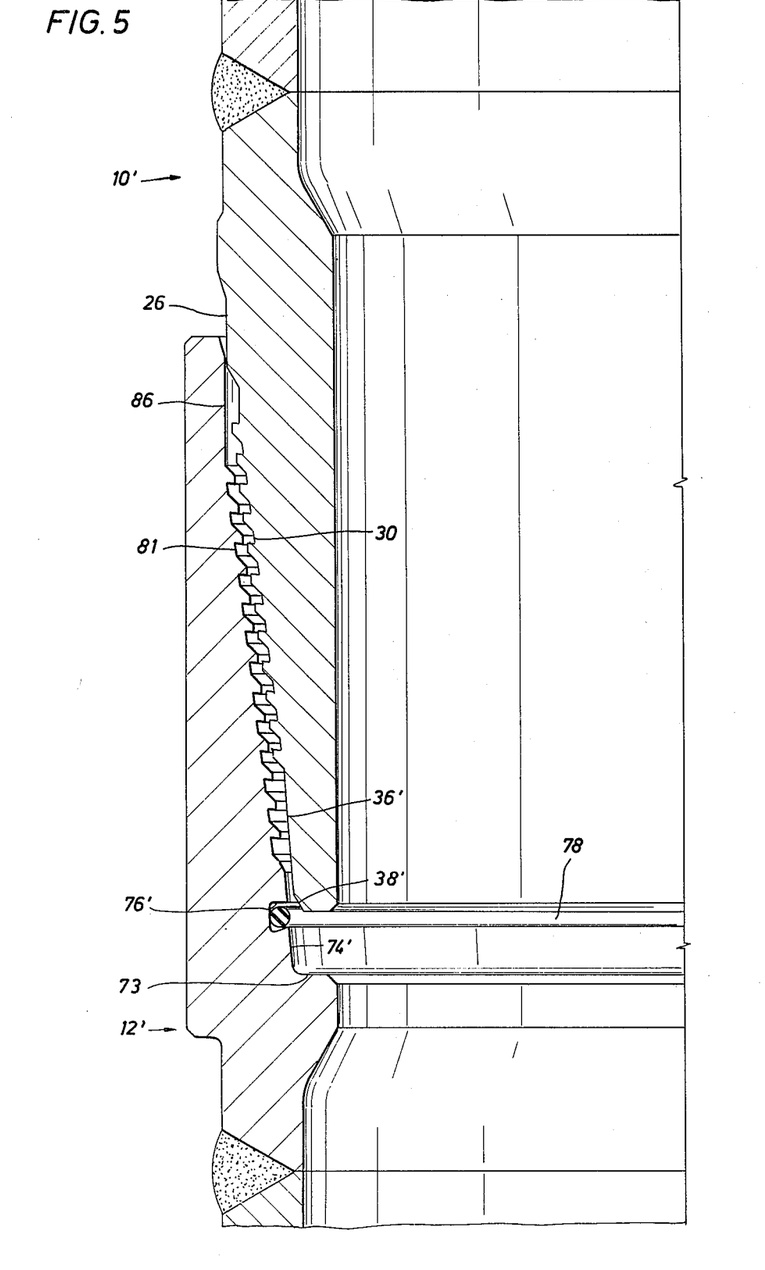
FIG. 5 is a view similar to FIG. 3 but with a slanted lower guide section on the pin and a complementary slant on the corresponding box receptacle.
Figure 6:
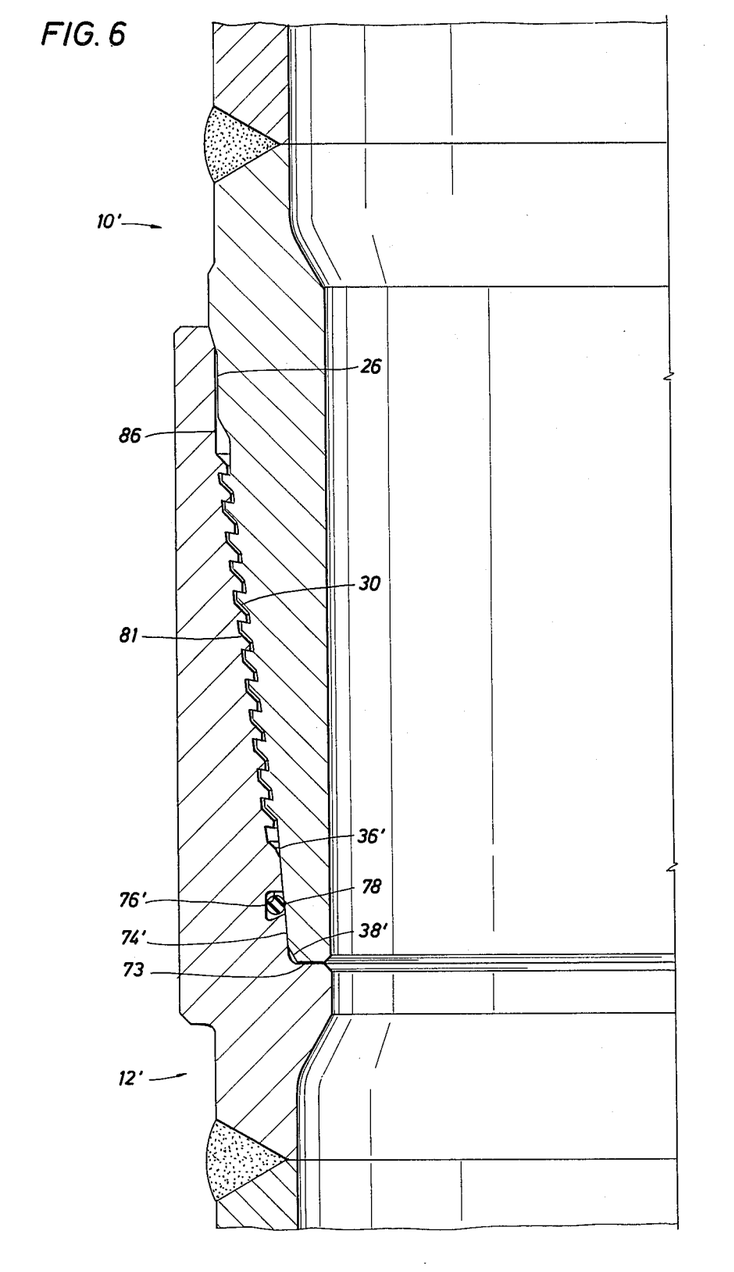
FIG. 6 is a view similar to FIG. 5 but with the box and pin connectors of FIG. 5 in full connection.

The present invention is also embodied in a pin joint indicated generally at 10' in FIGS. 5 and 6, and a box joint indicated generally at 12' in FIGS. 5 and 6. In FIG. 5 the pin 10' is shown aligned with and partially inserted within the box 12', but without mutual meshing engagement of the threads 30 and 81 carried by the pin and box, respectively. In FIG. 6, the connection between the pin 10' and the box 12' is complete, with wedging mating of the pin threads 30 with the box threads 81, and abutment of the bottom surface of the pin against the internal shoulder 73 of the box. With exceptions as noted hereinafter, the design of the pin 10' may be like that of the previously illustrated and described pin 10, and similarly the design of the box 12', with exceptions noted hereinafter, may be like that of the previously illustrated and described box 12. Thus, an upper cylindrical guide surface 26 carried by the pin 12' cooperates with an internal cylindrical wall, or receptacle, 86 of the box 12' in the alignment of the pin and box to avoid cross threading of the pin and box threads 30 and 81, respectively. However, rather than a cylindrical lower guide section, the pin 10' features a frustoconical lower guide surface 36', tapering downwardly and radially inwardly and ending in a bevelled edge 38'. Similarly, rather than a cylindrical lower flat, or receptacle, the pin 12' features a frustoconical internal surface 74', that also tapers downwardly and radially inwardly as illustrated in FIGS. 5 and 6. The acute angles of taper of the two surfaces 36' and 74' are preferably the same, and may be on the order of a few degrees, for example, relative to the axes of the pin 10' and box 12', respectively. The conical receptacle surface 74' is broken by a dove-tailed annular groove 76' in which is mounted an O-ring sealing member 78 for sealing engagement with the conical guide surface 36' when the pin 10' ahd box 12' are fully mated as illustrated in FIG. 6.

During the make up of the pin 10' with the box 12', the conical guide surface 36' cooperates with the tapered receptacle surface 74' to insure sufficient alignment of the pin and box to avoid cross threading. Nevertheless, as shown in FIG. 5, there is sufficient clearance between the surfaces 36' and 74' in the configuration of FIG. 5 to allow sufficient lateral movement between the pin 10' and the box 12' to facilitate stabbing of these two elements, and further to avoid extended rubbing of the O-ring seal member 78 around and along the pin surface 36'. Such relatively extensive wear on an O-ring seal member is to be avoided if possible as a potential cause of damage to the seal member and consequent leaking. It will be appreciated by reference to FIG. 5 that the maximum lateral clearance between the pin surface 36' and the box surface 74', with the two surfaces overlapping, occurs just as the surfaces begin to overlap as the pin 10' is moved longitudinally within the box 12'. The clearance between the surfaces 36' and 74' is minimized in the configuration shown in FIG. 6 wherein the threads 30 and 81 are mutually meshed and wedging the bottom of the pin 10' against the shoulder 73 of the box 12'. In that configuration, the clearance between the pin surface 36' and the box surface 74' is reduced to insure sealing engagement therebetween by means of the O-ring seal member 78.

The angle of taper of the pin guide surface 36' and that of the receptacle surface 74' may be varied, but is to be kept sufficiently small in any case to insure that cross threading is prohibited. Consequently, the permitted angle of the surfaces 36' and 74' relative to the common longitudinal axis of the pin 10' and box 12' in the mated configuration of FIG. 6, for example, is smaller for larger diameter threads.

Figure 7:
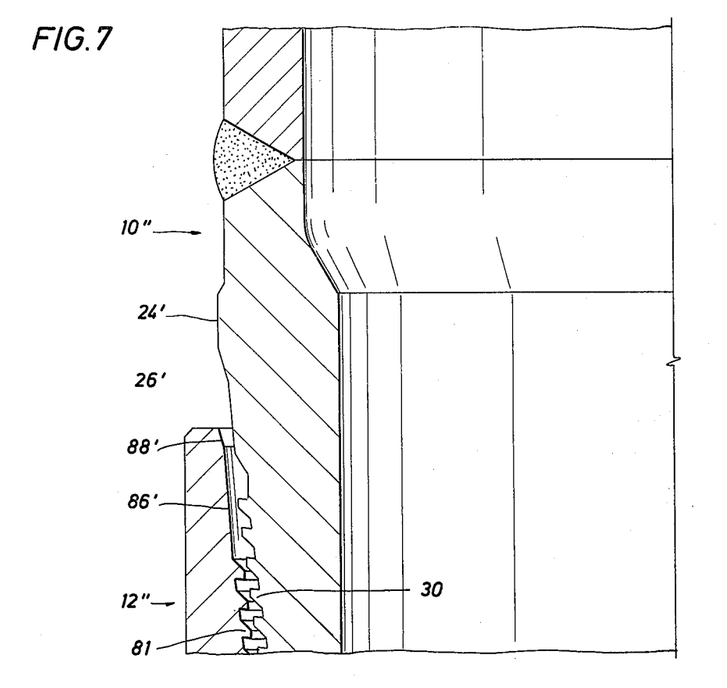
FIG. 7 is a fragment of a longitudinal cross section of box and pin connectors, in partial connection, with a slanted upper guide section on the pin and a complementary slant on the corresponding box receptacle.
Figure 8:
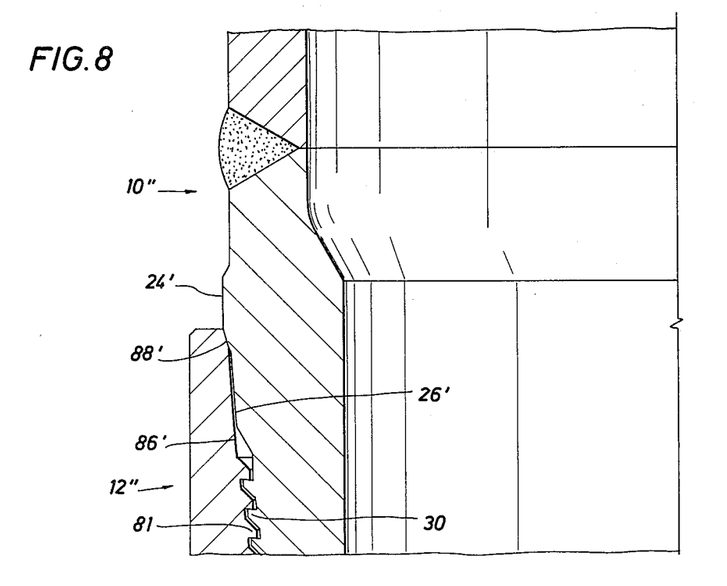
FIG. 8 is a view similar to FIG. 7 but with the pin and box connectors of FIG. 7 in full connection.

Still another variation of guide and receptacle surfaces in accordance with the present invention is shown in FIGS. 7 and 8, wherein a portion of a pin joint is indicated generally at 10" and a portion of a box joint is indicated at 12". In FIG. 7 the pin 10' and box 12' are mutually aligned but not threadedly engaged; in FIG. 8 the pin 10" and box 12" are fully made up, with the pin threads 30 meshed and wedged with the box threads 81. The pin 10", with exceptions discussed hereinafter, may be designed like the pin 10 or the pin 10' previously illustrated and described. Similarly, the box 12", with exceptions noted hereinafter, may be designed like pin 12 or pin 12' previously illustrated and described. However, the pin 12" features an upper guide surface 26" that is frustoconical, tapering downwardly and radially inwardly as viewed in FIGS. 7 and 8. Similarly, the box 12" features an upper inner receptacle wall 86' that is also frustoconical, tapering downwardly and radially inwardly as viewed in FIGS. 7 and 8. The acute angles of taper of the pin guide surface 26' and of the box receptacle wall 86', measured relative to the receptacle pin and box longitudinal axes, respectively, are preferably the same, and are typically on the order of a few degrees. An upset section 24' is separated from the conical upper guide section 26' by a tapered surface, and abuts a bevelled edge 88' of the box receptacle surface 86' in the made up configuration illustrated in FIG. 8.

The combination of the frustoconical guide surface 26' and receptacle surface 86' provides advantages similar to those provided by the frustoconical lower guide surface 36' and the corresponding frustoconical receptacle surface 74' of FIGS. 5 and 6 while still serving to ensure proper pin and box mutual alignment to avoid cross threading. Tapering the upper guide surface 26' and the corresponding receptacle surface 86' as illustrated in FIGS. 7 and 8, for example, increases the lateral clearance therebetween to facilitate stabbing of the pin 10" within the box 12". This lateral clearance between the overlapped guide surface 26' and the receptacle surface 86' is maximized when the pin 10" is positioned relative to the box 12" during make up so that the two surfaces 26' and 86' just begin to overlap. As the pin 10" is further inserted within the box 12", the lateral clearance between the surfaces 26' and 86' reduces to a minimum, achieved in the completely made up configuration illustrated in FIG. 8. The angle of taper of the surfaces 26' and 86' may be increased to increase the maximum lateral clearance between these two surfaces in an initial overlap configuration for the purpose of facilitating stabbing. However, in any case, the angle of taper must be sufficiently small to insure that the pin 10" and box 12" are not permitted to be mutually misaligned sufficiently to allow cross threading during make up. The same type of factors which dictate the upper limit of taper angle for surfaces 36' and 74' of FIGS. 5 and 6 determine the upper limit of taper angle for the upper guide surfaces 26' and the corresponding receptacle surface 86'. Thus, for example, the upper limit of the taper angle for the surfaces 26' and 86' decreases as the diameters of the pin threads 30 and box threads 81 increases.

A pin and box connector combination according to the present invention may be equipped with an upper guide surface and receptacle combination featuring cylindrical surfaces and a lower guide surface and receptacle combination which also features cylindrical surfaces, as illustrated in FIGS. 1-4. A combination of upper guide surface and corresponding receptacle featuring cylindrical surfaces, as shown in FIGS. 1-4, may be included in a pin and box combination according to the present invention with a lower guide surface and corresponding receptacle surface which are generally frustoconical, as illustrated in FIGS. 5 and 6. The present invention may also be provided with an upper guide surface and corresponding receptacle surface featuring frustoconical surfaces, as in FIGS. 7 and 8, in combination with a lower guide surface and corresponding receptacle surface which are cylindrical, as in FIGS. 1-4. Additionally, a pin and box combination according to the present invention may feature an upper guide surface and receptacle combination which is frustoconical, as shown in FIGS. 7 and 8, and a lower guide surface and receptacle surface which are also generally frustoconical, as illustrated in FIGS. 5 and 6.

The present invention provides a connector assembly including first and second generally complementary threaded connector members, with one connector member carrying first and second guide sections receivable by first and second voids, or receptacles, respectively, as parts of the other connector member. The two connector members may be partially joined with the guide sections partially inserted into the respective receptacles, whereby the tapered threads are forced into mutual alignment to avoid cross threading, though the threads are not mutually engaged. The two sets of threads include back-slanted load, or landing, surfaces to provide a wedge effect when mutually engaged, urging the connector members into tighter threaded engagement in response to forces tending to expand the outer connector member. Pin and box thread crests, being parallel to the pin and box longitudinal axes, facilitate make up. The pin end abuts a box shoulder to complete make up without the pin and box threads closing fully laterally. Thus, the joint may be completely made up, with the threads and shoulder loaded, with relatively low torque applied as compared to joints wherein the threads must mesh completely, for example. A seal carried by one connector member seats against an appropriate surface on the other member to seal the two connector members together.

While particular embodiments of the present invention and the method of use thereof have been shown and described, it is evident that minor changes may be made therein without departing from the true scope and spirit of the invention. It is the intention in the appended claims to cover all such changes and modifications.

I claim:

1. A connector assembly comprising:
   a. a first connector member including a first guide section and a second guide section axially displaced from, and of generally lesser external lateral dimension than, said first guide section;
   b. a second connector member for receiving said first connector member, including a first receptacle, for receiving said first guide section, and a second receptacle, for receiving said second guide section, axially displaced from and of generally lesser internal lateral dimension than said first receptacle;
   c. tapered external thread means, as part of said first member, positioned generally axially between said first and second guide sections;
   d. tapered internal thread means, as part of said second member, positioned generally axially between said first and second receptacles and generally complementary to said first thread means for threaded engagement therewith; and
   e. wherein said first and second guide sections may be partially received by said first and second receptacles, respectively, to align said first and second members without threaded engagement between said first and second thread means.

2. An assembly as defined in claim 1 further comprising seal means carried by one of said members for sealingly engaging the other of said members when said first and second members are connected together in threaded engagement between said first and second thread means.

3. An assembly as defined in claim 1 wherein:
   a. said external thread means comprises first threads with back slanted landing surfaces;
   b. said internal thread means comprises second threads with back slanted landing surfaces; and
   c. the meshing of said first and second threads provides a wedging effect between said respective back slanted landing surfaces urging said first and second threads into tighter engagement in response to forces tending to expand said second member.

4. An assembly as defined in claim 3 wherein:
   a. the crests of said first threads are parallel to the longitudinal axis of said first member; and
   b. the crests of said second threads are parallel to the longitudinal axis of said second member.

5. An assembly as defined in claim 3 further comprising first and second abutment means carried by said first and second member, respectively, whereby said first and second members may be completely connected with said first and second abutment means in mutual abutting engagement and said back slanted landing surfaces mutually wedged, but without said first and second threads completely meshed.

6. An assembly as defined in claim 1 wherein:
   a. the taper of said first thread means varies generally from approximately the lateral dimension of said first guide section to that of said second guide section; and
   b. the taper of said second thread means varies generally from approximately the lateral dimension of said first receptacle to that of said second receptacle.

7. An assembly as defined in claim 1 wherein said second guide section is adjacent the end of said first member and said first receptacle is adjacent the end of said second member.

8. An assembly as defined in claim 1 further comprising external shoulder means as part of said second member for supporting said second member.

9. An assembly as defined in claim 1 wherein:
   a. said first guide section and said first receptacle each comprises a generally cylindrical surface; and
   b. said second guide section and said second receptacle each comprises a generally cylindrical surface.

10. An assembly as defined in claim 1 wherein:
    a. said first guide section comprises a frustoconical surface and said first receptacle comprises a frustoconical surface generally complementary to said first guide section surface; and
    b. said second guide section comprises a frustoconical surface and said second receptacle comprises a frustoconical surface generally complementary to said second guide section surface.

11. An assembly as defined in claim 1 wherein:
    a. said first guide section and said first receptacle each comprises a generally cylindrical surface; and
    b. said second guide section comprises a frustoconical surface and said second receptacle comprises a frustoconical surface generally complementary to said second guide section surface.

12. As assembly as defined in claim 1 wherein:
    a. said first guide section comprises a frustoconical surface and said first receptacle comprises a frustoconical surface generally complementary to said first guide section surface; and
    b. said second guide section and said second receptacle each comprises a generally cylindrical surface.

13. A method of making a threaded connection between first and second longitudinal members, said members including generally complementary continuous threads, comprising the steps of:
    a. inserting an end of the first longitudinal member into an end of the second longitudinal member;
    b. inserting a firt guide section on said first longitudinal member in a first receptacle in said second longitudinal member and inserting a second guide section of said first longitudinal member in a second receptacle in said second longitudinal member;
    c. thereafter meshing threads on said first and second longitudinal members; and d. rotating one said longitudinal member relative to the other said longitudinal member to fully engage said threads.

14. Connecting apparatus comprising:
   a. an externally threaded member, the threads thereon being substantially tapered downwardly toward an end of the externally threaded member;
   b. said externally threaded member further having a first guide section adjacent one end of said threads and a second guide section at the other end of said threads;
   c. an internally threaded tubular member, the threads thereon being substantially tapered to complementarily receive the threads on said externally threaded member;
   d. said internally threaded member further having a first receptacle on one end of said internal threads and a second receptacle on the other end of said threads, which receptacles are sized to complementarily receive the first and second guide sections on said externally threaded member, respectively; and
   e. said taper of the threads on both said externally threaded member and said internally threaded member permitting engagement of said first and second guide sections with said first and second receptacles, respectively, prior to mutual threaded engagement of the threads on said externally and internally threaded members.

15. Apparatus as defined in claim 14 wherein:
   a. said threads on said externally threaded member comprise first threads with back slanted landing surfaces;
   b. said threads on said internally threaded member comprise second threads with back slanted landing surfaces; and
   c. the meshing of said first and second threads provides a wedging effect between said respective back slanted landing surfaces urging said first and second threads into tighter engagement in response to forces tending to expand said internally threaded member.

16. Apparatus as defined in claim 15 wherein:
   a. the crests of said first threads are parallel to the longitudinal axis of said externally threaded member; and
   b. the crests of said second threads are parallel to the longitudinal axis of said internally threaded member.

17. Apparatus as defined in claim 15 further comprising first and second abutment means carried by said externally and internally threaded members, respectively, whereby said members may be completely connected with said first and second abutment means in mutual abutting engagement and said back slanted landing surfaces mutually wedged, but without said first and second threads completely meshed.

18. Apparatus as defined in claim 14 wherein:
   a. the taper of said external threads varies generally from approximately the diameter of said first guide section to that of said second guide section; and
   b. the taper of said internal threads varies generally from approximately the diameter of said first receptacle to that of said second receptacle.

19. Apparatus as defined in claim 14 further comprising external shoulder means as part of said internally threaded member for supporting said member.

20. Apparatus as defined in claim 14 wherein:
   a. said first guide section and said first receptacle each comprises a generally cylindrical surface; and
   b. said second guide section and said second receptacle each comprises a generally cylindrical surface.

21. Apparatus as defined in claim 14 wherein:
   a. said first guide section comprises a frustoconical surface and said first receptacle comprises a frustoconical surface generally complementary to said first guide section surface; and
   b. said second guide section comprises a frustoconical surface and said second receptacle comprises a frustoconical surface generally complementary to said second guide section surface.

22. Apparatus as defined in claim 14 wherein:
   a. said first guide section and said first receptacle each comprises a generally cylindrical surface; and
   b. said second guide section comprises a frustoconical surface and said second receptacle comprises a frustoconical surface generally complementary to said second guide section surface.

23. Apparatus as defined in claim 14 wherein:
   a. said first guide section comprises a frustoconical surface and said first receptacle comprises a frustoconical surface generally complementary to said first guide section surface; and
   b. said second guide section and said second receptacle each comprises a generally cylindrical surface.

24. A pipe joint comprising:
   a. a tubular section;
   b. an internally, continuously threaded box connector on one end of said tubular section;
   c. an externally, continuously threaded pin connector on the other end of said tubular section;
   d. a first guide section on the pin connector at one end of the threads thereon;
   e. a second guide section on said pin connector at the other end of said threads thereon;
   f. a first receptacle in the box connector at one end of the threads therein, said first receptacle adapted to receive such first guide section of a like pipe joint; and
   g. a second receptacle in said box connector at the other end of the threads therein, said second receptacle being adapted to receive such second guide section of a like pipe joint;
   h. wherein such first receptacle may receive such first guide section, and such second receptacle may receive such second guide section, of a like pipe joint prior to threaded engagement of said threads on such pin connector and in such box connector.

25. A pipe joint as defined in claim 24 wherein said first guide section and said first receptacle are larger in diameter than said second guide section and said second receptacle.

26. A pipe joint as defined in claim 25 wherein said threads on said pin and in said box are generally tapered from the diameter of said first guide section and said first receptacle, respectively, to the diameter of said second guide section and said second receptacle, respectively.

27. A pipe joint as defined in claim 24 wherein the threads of said pin connector and the threads of said box connector are each back slanted to provide a wedge effect urging a tighter threaded engagement between such complementary connectors of like pipe joints in response to forces tending to expand said box connector.

28. A pipe joint as defined in claim 24 further comprising seal means carried by said box connector and seat means as part of such pin connector wherein said seal means may sealingly engage such seat means of a like pipe joint when such pin and box connectors are engaged to connect said pipe joints.

29. A pipe joint as defined in claim 24 wherein the crests of the threads of said pin connector and the crests of the threads of said box connector are parallel to the longitudinal axis of said pipe joint.

30. A pipe joint as defined in claim 24 wherein at least one of said guide sections comprises a frustoconical surface, and the corresponding receptacle comprises a frustoconical surface.

* * * * *